Patented Jan. 29, 1929.

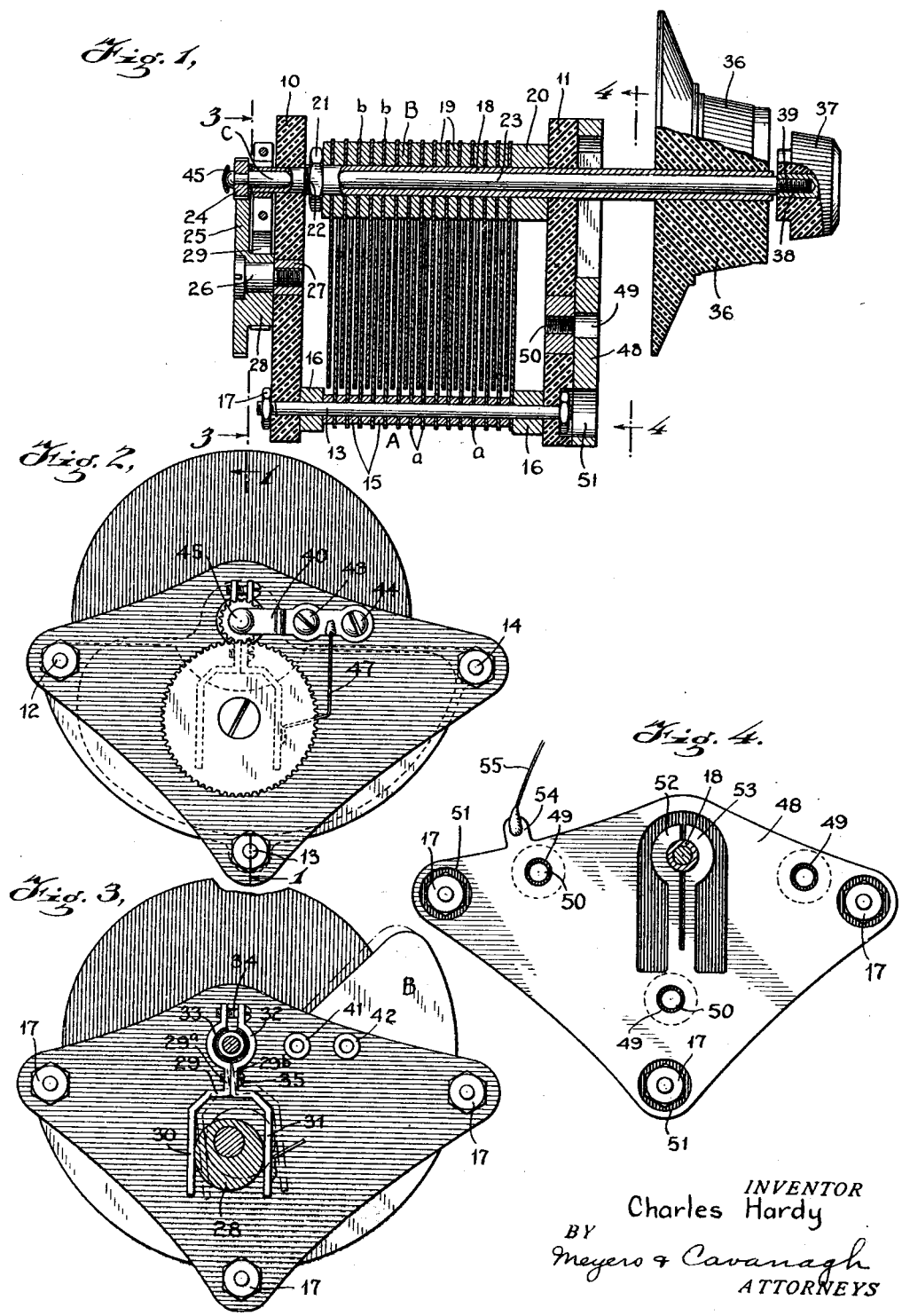

1,700,222

UNITED STATES PATENT OFFICE.

CHARLES HARDY, OF NEW YORK, N. Y., ASSIGNOR TO AMSCO PRODUCTS, INC., OF NEW YORK, N. Y., A CORPORATION OF NEW YORK.

VARIABLE CONDENSER.

Application filed July 26, 1923. Serial No. 653,832.

This invention relates to an electrical condenser, and more particularly to a variable air condenser; and has special reference to the provision of a variable air condenser in which the capacitative relation between stationary and movable elements or plates of the condenser may be varied by coarse and fine adjustments.

One of the prime objects of my present invention comprehends the provision of a variable air condenser having relatively movable plates or sets of plates in which one of the plates or plate sets may be moved to produce coarse and fine adjustments of the capacity of the condenser for obtaining sharp and precise tuning.

Another prime object of the invention relates to an improved variable air condenser in which the coarse or rough and fine or precise adjustments are obtained by movement of a single plate set produced by operation of coaxially arranged shafts.

Still further objects of the invention are the provision of a variable air condenser of the above referred to type having a construction and arrangement of parts such as to permit the condenser to be mounted with ease on a panel or like support; the further provision of a condenser in which the fine or delicate adjustment of the movable plate set is obtained by means of a system or train of gearing electrically inter-related in a manner to prevent capacitative changes which may be caused by looseness of the gearing and the resulting uncertainty of contact during operation thereof; the still further provision of a condenser provided with a mounting plate constructed for securely supporting the condenser on a panel and capable of functioning as a capacitative or electrostatic shield for the condenser and as a mounting template therefor; and the provision of a condenser of simple design and having a construction subject to simplicity of manufacturing and assembling steps and capable of efficient service and convenient use.

To the accomplishment of the foregoing and such other objects as may hereinafter appear, my invention consists in the elements and their relation one to the other, as hereinafter particularly described and sought to be defined in the accompanying claims, reference being had to the accompanying drawings showing a preferred embodiment of my invention, and in which:

Fig. 1 is a cross-sectional view of the condenser taken on the line 1—1, Fig. 2, Fig. 2 is a rear elevational view thereof, Fig. 3 is a rear elevational view taken in cross-section on the line 3—3, Fig. 1, and Fig. 4 is a front elevational view taken in cross-section on the line 4—4, Fig. 1.

Referring now more in detail to the drawings, the condenser embodying my present invention comprises relatively movable plates or plate sets, preferably in the form of a stationary set of plates or stator A having a plurality of superposedly positioned plates $a, a$ and a rotatable set of plates or rotor B having a plurality of superposedly positioned plates $b, b$ arranged in alternating or interleaving relation with the stator plates $a$, the rotor plates being movable to obtain first a rough or coarse adjustment, and then a fine or precise adjustment of the capacity of the condenser by means including coaxially arranged operated shafts generally designated as C.

The stator and rotor sets of plates A and B are carried by and supported on the rear and front supporting plates 10 and 11 made of an insulating material such as hard rubber, the stator set of plates being built up on the spaced posts 12, 13 and 14 received by aligned apertures in the supporting plates 10 and 11, the stator plates being spaced from one another and from the end supporting plates by means of the spacers or washers 15 and the end spacers 16, the parts being secured as a unit by means of the terminal nuts 17, 17 received by the threaded ends of the posts 12 to 14, the manner of assembling these parts being well understood by those skilled in the art.

The rotor plate set B is built up on a shaft 18 journalled in the rear and front supporting plates 10 and 11, the plates of the rotor being spaced from one another by means of the spacers or washers 19, and from the front supporting plate 11 by means of the spacer 20, the nut 21 received by the threaded portion 22 of the shaft 18 being provided for securely locking the plates together and against the front supporting plate 11. By means of this construction it will be seen that upon operation or rotation of the shaft 18, the rotor plate set may be adjusted to produce an approximate or rough capacity setting.

For obtaining a fine or exact adjustment of the rotor plate set, I provide means for imparting slight changes in the movement of the rotor after an approximate setting has been obtained, the said means including a shaft 23 arranged coaxially with and within the shaft 18 and motion producing mechanism connecting the said shafts, the said mechanism comprising a pinion 24 fixed to the rear end of the shaft 23 and meshing with a gear 25 rotatable in the screw stud 26 which is threadedly received by a tapped bore or an insert 27 in the rear plate 10, the said gear carrying a cam or eccentric 28 which may be and is preferably formed integrally with the gear 25. Cooperating with the eccentric 28 there is provided an eccentric strap member generally designated as 29 formed of two similar elements $29^a$ and $29^b$ connected together by the screw 35 and shaped to provide a forked member at one end having the tines 30 and 31 resiliently engaging the eccentric and defining an eccentric strap and a collar member 32 at the other end embracing the shaft 18, a friction bushing 33 preferably of hard rubber being interposed between the shaft 18 and the collar member 32, the construction being such that angular movement or rotation of the eccentric strap member from a position such as shown in full lines in Fig. 3 to a position as shown in dotted lines in said figure will effect the rotation of the rotor B from the full to the dotted line position shown in said figure. To provide the proper degree of friction between the collar member 32 and the shaft 18 and to take up for any wear of the friction bushing, the member 29 is preferably provided with the adjusting screw 34.

For rotating the outer and inner shafts 18 and 23 respectively, the outer shaft is provided with a dial 36 fixed thereto at the front end thereof, and the inner shaft 23 is provided with an operating knob 37 having a threaded insert 38 receiving the threaded end portion 39 of the shaft 23. For resiliently urging both of the operating shafts in one direction to take up for any looseness of the parts, I preferably provide the member 40 removably fitted to the posts 41 and 42 mounted on the rear plate 10, the parts being attached to the said plate by means of the threaded securing elements 43 and 44. The member 40 is provided with a disk-shaped terminal 45 engaging the end of the shaft 23, as is clearly shown in Figs. 1 and 2 of the drawing, for resiliently urging this shaft and the shaft 18 in one direction, the shaft 18 being engaged by a washer 46 interposed between the rear end of the same and the pinion 24.

With the provision of this construction, it will be seen that for obtaining an approximate condenser setting, the control handle dial 36 is rotated; and for obtaining a precise setting, the control handle or knob 37 is rotated for operating the motion reducing gears and the eccentric mechanism to produce a reduced angular movement of the shaft 18 and the rotor thereon. It will be further seen that by the fine as well as the coarse adjustment, only the shaft 18 and hence the dial 36 is rotated so that only a single dial reading need be observed for the final condenser setting. It will be further noted that the gearing is so constructed that motion will be transmitted only from the inner shaft 23 to the outer shaft 18 so that when the control dial 36 is rotated, the knob 37 is held stationary, rotation of the dial 36, however, being obtainable upon operation or rotation of the knob 37.

I have found that the operation of gearing for rotating the movable set of plates is oftimes accompanied by objectionable capacitative changes in the condenser due to the looseness between the gears, this causing a making and breaking of contact between the gear elements. To obviate these capacitative changes, the gearing of the present invention is electrically connected so as to provide for continuity of contact irrespective of the unavoidable looseness of gears; and to this end the pinion 24 is electrically united to the gear 25 by means of a conductor 47, which preferably connects the resilient member 40 with the eccentric strap member 29. To further eliminate the objectionable capacitative changes and to eliminate undesirable absorption effects produced by insulating dielectrics in the electrostatic field between plates or elements of opposite potentials, the rear end plate of the condenser on one side of the end supporting plate 10 is made of the same potential as the gearing elements carried on the opposite side of said end plate, this being accomplished by selecting the last plate of the rotor as the end plate.

As heretofore mentioned, my present invention contemplates the provision of a condenser provided with a mounting plate constructed for securely supporting the condenser on a panel, the mounting plate being designed so as to be capable of functioning as an electrostatic shield for the condenser, and as a mounting template therefor. The mounting plate of my invention preferably comprises a metallic plate member 48 shown in Figs. 1 and 4 of the drawings, the said plate being provided with the three spaced orifices 49, 49 arranged to align with the tapped bores 50 formed in the front supporting plate 11, the tapped bores being intended for receiving securing elements when the condenser is mounted on a panel, the said plate 48 also preferably being orificed as at 51 for minimizing the liability of electrical engagement with the nuts 17 of the stator. The mounting plate 48 is removably carried by the shaft 18 of the condenser, and is constructed so as to electrically engage the said shaft in use, and to this end the central portion of the mounting plate is orificed so as to form the resilient members 52 and 53 arranged to surround and frictionally engage the shaft 18. The plate 48 may additionally be provided with a stud 54, to which may be connected a conductor 55 for connecting the plate to ground. Before attaching the condenser to a panel, the mounting plate may be removed from the shaft 18 and used as a template for locating the position of the apertures on the panel to align with the tapped bores 50 of the end plate 11. After use as a template, the mounting plate is then replaced in position on the shaft in electrical engagement therewith, and may be used as an electrostatic shield for the condenser.

The method of making and using my improved condenser will in the main be apparent from the above detailed description thereof. It will be further seen that only a single plate set is employed for obtaining the desired adjustments through the agency of coaxially positioned shafts, the arrangement of the condenser parts being thereby considerably simplified, producing a condenser of simple design subject to facility of manufacturing and assembling steps, and capable of being mounted on a panel and operated therefrom with ease and convenience.

While I have shown my device in the preferred form, it will be obvious that many changes and modifications may be made in the structure disclosed without departing from the spirit of the invention, defined in the following claims.

I claim:

1. A variable condenser comprising relatively movable condenser plate sets and means for relatively moving the plate sets, the said means comprising coaxial shafts the outer of which carries one of the plate sets, a pinion fixed to the inner of said coaxial shafts, a gear meshing with said pinion, a cam operated by said gear and an eccentric strap operated by the cam, the said eccentric strap including a portion frictionally engaging the said outer shaft.

2. A variable condenser comprising front and rear supporting plates, relatively movable condenser plate sets carried by the supporting plates, and means for relatively moving the plate sets, the said means comprising coaxial shafts the outer of which carries one of the plate sets, a pinion fixed to the inner of said coaxial shafts, a gear meshing with said pinion carried by the rear supporting plate, a cam fixed to said gear, and an eccentric strap operated by the cam, the said eccentric strap including a portion frictionally engaging the said outer shaft.

3. A variable condenser comprising relatively movable condenser elements, a plate carried by and removably attachable thereto interposable between the same and a support such as a panel, the said plate being adapted for employment as a mounting template.

4. In combination with a variable condenser having a stationary plate set, a movable plate set, and means including a shaft for moving the latter set, of a front metallic plate attachable to the condenser in electrical engagement with the shaft for defining an electrostatic shield and removable from the condenser for use as a mounting template.

5. An electrical instrument comprising a stationary member, a movable member and control means for the movable member for producing either coarse or fine adjustments thereof, the said means comprising coaxial shafts, the outer of which carries the movable member, a pinion fixed to the inner of said coaxial shafts, a gear meshing with said pinion, a cam operated by said gear, and an eccentric strap operated by the cam, the said eccentric strap including a portion frictionally engaging the said outer shaft.

6. An electrical instrument comprising a stationary member, a movable member and control means for the movable member for producing either coarse or fine adjustments thereof, the said control means including coaxial shafts, the outer of which carries the said movable member, meshing gears, one of which is fixed to the inner of said axial shafts and eccentric means connecting the other of said meshing gears with the outer of said axial shafts.

Signed at New York city, in the county of New York and State of New York, this 24 day of July, A. D. 1923.

CHARLES HARDY.